United States Patent [19]

Harrill

[11] 4,061,290

[45] Dec. 6, 1977

[54] EXTENSION CORD REEL AND CASE

[76] Inventor: Thomas D. Harrill, Rte. 1, Mabank, Tex. 75147

[21] Appl. No.: 686,671

[22] Filed: May 13, 1976

[51] Int. Cl.$^2$ .......................................... B65H 75/40
[52] U.S. Cl. ................................ 242/96; 191/12.2 R
[58] Field of Search ................... 242/96, 85, 84.8, 100, 242/100.1, 107, 107.13, 106; 191/12.2 R, 12.4

[56] References Cited

U.S. PATENT DOCUMENTS

| 2,683,000 | 7/1954 | Beiderwell | 242/96 |
| 2,801,303 | 7/1957 | Pailing | 191/12.4 |
| 3,837,448 | 9/1974 | Hagstrom | 191/12.2 R |
| 3,863,860 | 2/1975 | Quenot | 242/96 X |
| 3,874,489 | 4/1975 | Christensen | 191/12.2 R |

Primary Examiner—Stanley N. Gilreath
Assistant Examiner—John M. Jillions
Attorney, Agent, or Firm—Clarence A. O'Brien; Harvey B. Jacobson

[57] ABSTRACT

A hollow, axially short and generally cylindrical body is provided and is open at one end. The other end of the body includes a closure end wall and a generally centrally disposed stub shaft portion is supported from and projects inwardly of the closure end wall toward the open end body. A wire spool, including a central elongated hollow core, and including a fixed inner end flange at one end is rotatably journaled on the stub shaft portion with the end flange opposing and closely spaced from the inner surface of the end wall. An outer end flange is removably secured over the outer end of the core and substantially close, but is rotatably received in the open end of the body. The outer end flange has a central opening formed therethrough aligned with the interior of the core, the core has an opening formed therein for receving one end of an extension cord wound on the core within the interior of the latter for withdrawal through the central opening in the outer end flange and one side wall portion of the body has an opening formed therein for slidably receving the other end of the extension cord therethrough.

8 Claims, 3 Drawing Figures

EXTENSION CORD REEL AND CASE

BACKGROUND OF THE INVENTION

Various forms of extension cord reels and cases have been heretofore provided. However, a need exists for an extension cord reel and case which is of lightweight construction, inexpensive to manufacture and convenient to use. By providing an extension cord reel and case including these three aspects, a useful and highly desirable product will be provided.

Examples of extension cord reels and cases, as well as other structures, including some of the general structural and operational features of the instant invention are disclosed in U.S. Pat. Nos. 701,681, 898,320, 1,340,712, 2,275,258, 3,212,729 and 3,686,767.

BRIEF DESCRIPTION OF THE INVENTION

The extension cord reel and case of the instant invention includes an axially short hollow cylindrical body closed at one end and including a stub shaft portion supported from the closed end of the body and projecting toward the open end thereof upon which an extension cord reel is journaled. The reel includes opposite end flanges with the end flange thereof adjacent the open end of the body removably supported from the reel core and substantially closing but rotatably received in the open end of the body. The reel end flange closing the open end of the body has a central opening formed therein and the reel core includes an opening therethrough whereby one end of the associated extension cord may project through the last two mentioned openings. In addition, a crank handle is shiftably supported from the end flange of the reel closing the open end of the body and is movable between a retracted position inwardly of the end flange and an extended operative position projecting outwardly of the end flange and eccentrically positioned relative to the axis of rotation of the core.

The main object of this invention is to provide an extension cord reel and case which may be used to conveniently store, transport and extend an extension cord.

Another object of this invention is to provide an apparatus in accordance with the preceding object and including structural features enabling the apparatus to be readily constructed of plastic by molding processes.

Still another object of this invention is to provide a device in accordance with the preceding objects and which is adapted to be used in conjunction with various different types of extension cords.

A final object of this invention to be specifically enumerated herein is to provide an extension cord reel and case in accordance with the preceding objects and which will conform to conventional forms of manufacture, be of simple construction and easy to use so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

DETAILED DESCRIPTION OF THE INVENTION

Figure 1:
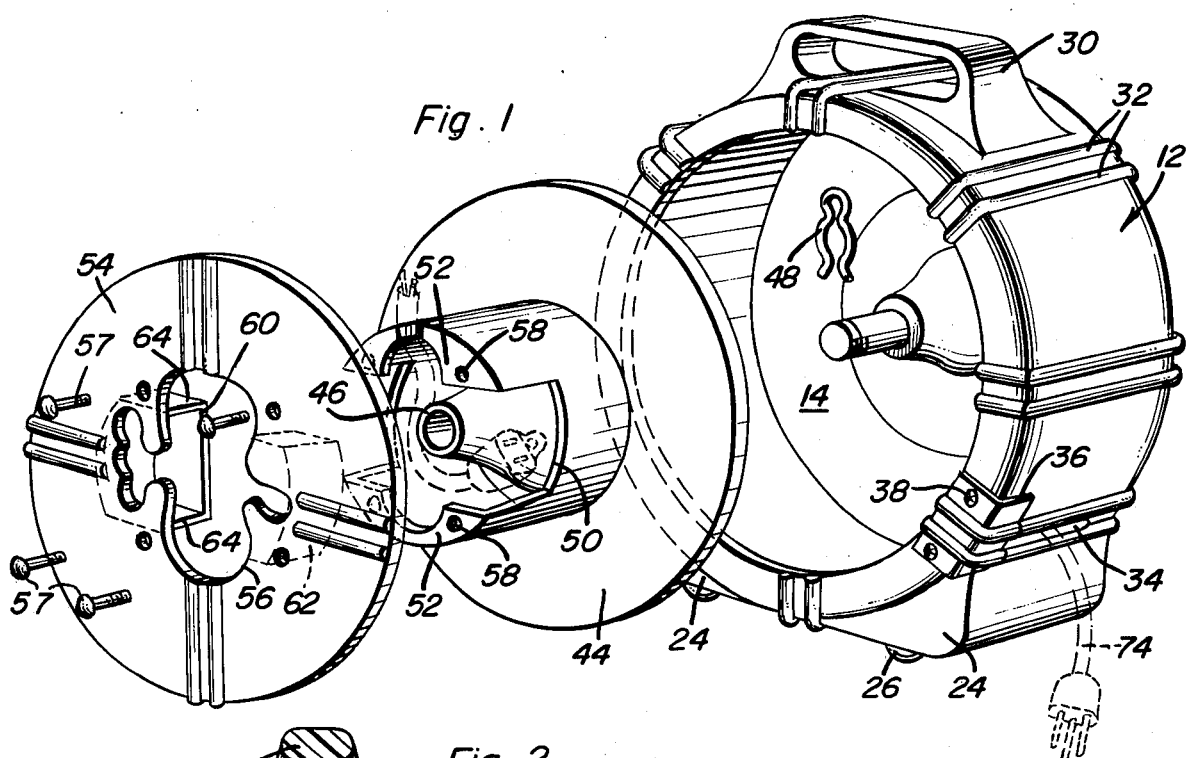
FIG. 1 is an exploded perspective view of the invention.

Referring now more specifically to the drawings, the numeral 10 generally designates the extension cord reel and case assembly of the instant invention. The assembly 10 includes an axially short horizontally disposed generally cylindrical body referred to in general by the reference numeral 12. The body 12 includes an imperforate end wall 14 at one end thereof and a radially inwardly projecting outer annular partial end wall 16 at the other end.

The central portion of the inner surface of the end wall 14 includes a central inwardly projecting mounting boss 18 from whose inner portion a further inwardly projecting cylindrical stub shaft 20 is supported. The inner free end of the stub shaft 20 includes a circumferential groove 22.

Opposite side portions of the lower periphery of the body 12 include outward projections 24 and each projection 24 includes a pair of depending abutment members 26 defining support feet and the feet 26 include lower surface portions widely spaced apart in a horizontal plane for support of the body 12 from a horizontal support surface 28. In addition, the upper periphery of the body 12 includes an integral handle 30 whereby the assembly 10 may be conveniently carried and the external surfaces of the body 12 are provided with spaced reinforcing ribs 32. Also, one side portion of the lower peripheral portion of the body 12 includes a longitudinally extending slot 34 which opens through the inner periphery of the annular end wall 16 and the open end of the slot 32 is closed by means of an angle member 36 removably secured to the portions of the end wall 16 on opposite sides of the open end of the slot 34 by means of fasteners 38.

The assembly 10 further includes a spool assembly referred to in general by the reference numeral 10. The spool 40 includes a substantially cylindrical core 42 having an end wall or flange 44 secured across one end of the core 42 and the central portion of the wall 44 defines a center sleeve portion 46 which projects into the interior of the core 42, the sleeve portion being rotatably journaled on the stub shaft 20 and retained against axial displacement therefrom by means of a clip 48 readily removably engaged with the groove 22.

The end of the core 42 remote from the end wall 44 includes a pair of diametrically opposite endwise outwardly opening notches 50 formed therein and diametrically opposite inturned flange portions 52 intermediate the notches 50.

An outer end flange or end wall 54 having a central opening 56 formed therein is secured over the end of the core 42 remote from the end wall or flange 44 by means of threaded fasteners 57 secured through the end wall 44 and through bores 58 formed in the flange portions 52. In addition, diametrically opposite portions of the inner surface of the end wall 54 include inwardly projecting structures 60 and 62 which are keyed in the notches 50. Further, it will be noted that the end wall 54 is substantially coplanar with the end wall 16, but rotatably received inwardly of the inner periphery of the end wall 16.

Figure 2:
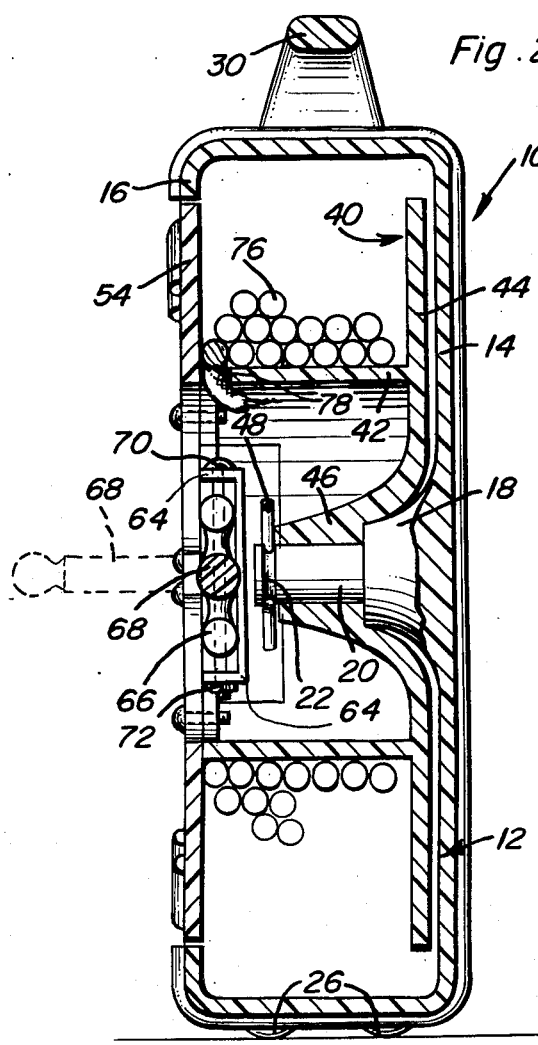
FIG. 2 is an enlarged vertical diametric sectional view of the invention.
Figure 3:
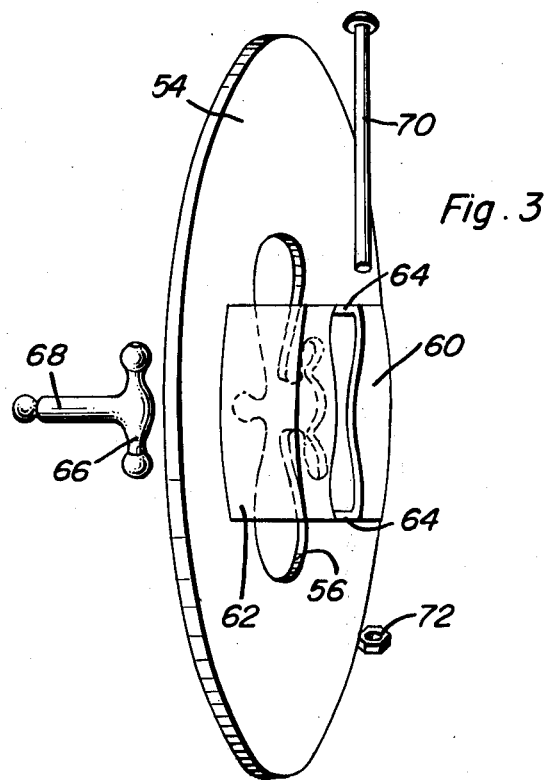
FIG. 3 is an exploded perspective view of the outer end flange portion of the reel portion of the invention illustrating the manner in which the crank handle is removably pivotally supported therefrom.

The structure 60 includes opposing inwardly projecting wall portions 64 between which a cross shaft portion 66 of a crank handle 68 is pivotally supported by means of a pivot fastener 70 passed through the wall portions 64 and secured therethrough by a nut 72. The crank handle 68 is swingable between the fully recessed position illustrated in FIG. 2 in solid lines and the extended position thereof illustrated in phantom lines in FIG. 2, with the crank handle 68 eccentrically located relative to the axis of rotation of the sleeve portion 46. When the crank handle 68 is in the extended position, it may, of course, be used as a crank to rotate the spool assembly 40 in order to wind the end portion 74 of an extension cord 76 on the spool assembly 40 back into the body 12. Of course, the end portion of the extension cord 76 remote from the end portion 74 projects through an opening 78 provided in the core 42 and may project outwardly through the central opening 56 in the outer end wall 54 of the spool assembly 40.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. An extension cord reel and case assembly, said assembly including a hollow generally cylindrical body open at one end and including a closure end wall at the other end, a generally centrally disposed stub shaft portion supported from and projecting inwardly of said closure end wall toward the open end of said body, a wire spool including a central elongated hollow core supporting a fixed inner end flange at one end, said end flange projecting radially outwardly of and about said one end of said core and including a central portion registered with the interior of said one end of said core defining a center sleeve portion projecting from said end flange toward the other end of said core, said sleeve portion being rotatably journaled on said stub shaft portion with said end flange opposing and closely spaced from the inner surface of said end wall, and an outer end flange removably supported from said other end of said core substantially closing but rotatably received in said one end of said body and defining a central opening therethrough aligned with the interior of said core, said body including one side wall portion having an opening formed therein for slidably receiving one end of an extension cord wound on said core therethrough, said core having an opening formed therethrough for receiving the other end of said cord therethrough, whereby said other cord end may be projected outwardly through said other end of said core and the central opening in said outer end flange, a crank handle, means shiftably mounting said crank handle from said outer end flange for movement between an inoperative position recessed inwardly of said outer end flange within said other end of said core and an extended position projecting outwardly of said outer end flange and spaced outwardly of the axis of rotation of said core relative to said stub shaft portion, said outer end flange including an inwardly projecting portion secured to said core for rotation therewith and from which said crank handle is pivotally supported for angular displacement between said extended and inoperative positions.

2. The combination of claim 1, wherein said stub shaft portion includes a free end which projects through said sleeve portion toward the open end of said body, and means releasably engaged with said free end of said stub shaft portion retaining said sleeve portion against axial removal therefrom.

3. The combination of claim 2, wherein said one side wall portion opening comprises a slot opening end of said body, the open portion of said slot being closed by a closure member removably supported from and bridging the portions of said body on opposite sides of said slot.

4. An extension cord reel construction including a hollow body having opposite ends, one end of said body being open and the other end of said body including a closure end wall, a generally, centrally disposed stub shaft portion supported and projecting inwardly from said closure end wall toward the open end of said body, a wire spool including an elongated central core supporting fixed inner flange means at one end projecting radially outwardly from said core, said core defining a central journal portion opening axially outwardly of said one end of said core and journaled on said stub shaft portion with said flange means closely opposing the inner surface of said closure end wall, the other end of said core being hollow and including second radially outwardly projecting flange means supported therefrom substantially closing but rotatably received in said one end of said body and having a central opening therethrough opening into the hollow other end of said core, said body including one side wall portion having an opening formed therethrough for slidably receiving one end of an extension cord wound on said core therethrough, said core having an opening formed therethrough between said flange means opening into said hollow other end of said core for receiving the other end of said cord therethrough, whereby said other cord end may be projected outwardly through said other end of said core and the central opening in said second flange means, a crank handle, means pivotally mounting said crank handle from said second flange means for movement between an inoperative position recessed inwardly of said central opening and an extended position projecting outwardly of said central opening and spaced radially outwardly of the axis of rotation of said core relative to said stub shaft portion, said second flange means including an inwardly projecting portion removably secured to said core for rotation therewith and from which said crank handle is pivotally supported.

5. The combination of claim 4, wherein said one side wall portion opening comprises a slot opening through the open end of said body, the open portion of said slot being closed by a closure member removably supported from and bridging the portions of said body on opposite sides of said slot.

6. The combination of claim 4, wherein said one end of said body includes an integral inwardly projecting annular partial end wall, said second flange means being circular and substantially coplanar with said annular partial end wall.

7. The combination of claim 4, wherein said body, when said stub shaft portion is horizontally disposed, includes an upper handle defining portion and a lower portion including downwardly facing abutment portions widely spaced apart in a horizontal plane.

8. The combination of claim 4, wherein said stub shaft portion includes a free end which projects through said journal portion into the hollow other end of said core toward the open end of said body, and means releasably engaged with said free end of said stub shaft portion retaining said journal portion against axial removal therefrom.

* * * * *